(12) United States Patent
Angelillis

(10) Patent No.: US 11,942,067 B2
(45) Date of Patent: Mar. 26, 2024

(54) MODULAR PEDALBOARD ARRANGEMENT

(71) Applicant: Judson Charles Angelillis, Safety Harbor, FL (US)

(72) Inventor: Judson Charles Angelillis, Safety Harbor, FL (US)

(73) Assignee: Judson C Angelillis, Safety Harbor, FL (US)

( * ) Notice: Subject to any disclaimer, the term of this patent is extended or adjusted under 35 U.S.C. 154(b) by 467 days.

(21) Appl. No.: 17/366,939

(22) Filed: Jul. 2, 2021

(65) Prior Publication Data

US 2023/0005461 A1 Jan. 5, 2023

(51) Int. Cl.
| G10H 1/34 | (2006.01) |
| F16B 2/20 | (2006.01) |
| G10G 5/00 | (2006.01) |

(52) U.S. Cl.
CPC ............. *G10H 1/348* (2013.01); *F16B 2/20* (2013.01); *G10G 5/00* (2013.01); *G10H 2210/155* (2013.01)

(58) Field of Classification Search
CPC .... G10H 1/348; G10H 2210/155; G10G 5/00; F16B 2/20
See application file for complete search history.

(56) References Cited

U.S. PATENT DOCUMENTS

| 6,459,023 | B1 | 10/2002 | Chandler |
| 8,641,385 | B2 | 2/2014 | Koehl |
| 9,520,118 | B2 | 12/2016 | Canivell Grifols et al. |
| 9,620,094 | B2 | 4/2017 | Abbate |
| 9,691,369 | B2 | 6/2017 | Trifilio |
| 9,947,302 | B2 | 4/2018 | Canivell Grifols et al. |
| 9,997,149 | B2 | 6/2018 | Trifilio |
| 10,163,430 | B2 | 12/2018 | Jashyn |
| 10,204,609 | B2 | 2/2019 | Canivell Grifols |
| 2014/0131543 | A1* | 5/2014 | Goto ...................... G10H 1/348 248/429 |
| 2020/0027433 | A1* | 1/2020 | Wilfer ...................... G10H 1/34 |
| 2023/0111195 | A1* | 4/2023 | Garrison ................ F16M 11/10 248/200 |

FOREIGN PATENT DOCUMENTS

DE 202010011970 U1 * 12/2010 ............. G10H 1/348

OTHER PUBLICATIONS

Intheblues; Random Pedalboard Setup The Aclam Pedalboard & Danelectro Pedals; https://www.youtube.com/watch?v=RYRzTKyAkpQ; accessed on Dec. 5, 2023; published Apr. 24, 2019. (Year: 2019).*

* cited by examiner

Primary Examiner — Daniel J Colilla

(57) ABSTRACT

A pedalboard arrangement (600), including: a right support end (102); a left support end (104); a pair of support members (106) configured to support a foot pedal for musical effects, each secured in position between the right support end and the left support end, and each including a clip feature (110) that extends along a long axis (112) of a respective support member; and an attachment device (300) including: a clip (304) configured to clip onto the clip feature and remain retained thereon via a resilience of the clip at a variety of locations along the long axis; and a clip connector (306) including a clip hole (308) through a first end (310) configured to receive a fastener associated with the foot pedal and a second end (322) connected to the clip.

20 Claims, 14 Drawing Sheets

MODULAR PEDALBOARD ARRANGEMENT

FIELD OF THE INVENTION

The invention relates to a musical effects pedalboard arrangement. More specifically the disclosed invention relates to a pedalboard with support members that are extendable and a musical effects pedal attachment device used to connect a musical effects pedal to the horizontal mounting members.

BACKGROUND OF THE INVENTION

Musician often use musical effects pedals to vary the sound of the music they are playing. Musical effects pedals ("pedals") generally only provide one varying sound for each pedal, so a musician who likes to create many different sounds with their instrument would need to have many musical effects pedals. Keeping the pedals scattered around on the floor would be unsuitable for many reasons. The pedals could become easily disconnected and moving the pedals from one location to another would also be very cumbersome. One solution is for the musician to mount their pedals on a pedalboard. This provides quick access to their preferred pedals.

Prior art pedalboards have limitations. For example, many are limited to specific fixed sizes and also a particular musical effects pedal connection means. Also, many musicians may play in a variety of bands, each band requiring a different pedalboard setup with different pedals. Current pedalboards do not lend themselves to easy pedal swapping or quickly modifying the pedalboard size to accommodate more or fewer pedals. Another downfall of existing pedalboards is the way they connect the musical effects pedal to the pedalboard. In some cases, this done with a hook and loop fastener arrangement. The hook side may be placed on the back of the effects pedal and the loop side may be placed on the pedalboard. The hook and loop generally have an adhesive backing to adhere it to the appropriate surface. This connection method is not very secure and pedals can become loose and fall off the board, risking damage to the pedal. Additionally, if the hook and loop is removed from the effects pedal it can leave a sticky residue. This is less than ideal as pedals are becoming more expensive and also because a musician would not want to ruin the value of a vintage pedal with this residue. There are pedalboards with connection means other than hook and loop, but these connection means may require a threaded connection and a tool such as a screwdriver in order to swap pedals in and out. This presents a problem when, for example, the musician doesn't have the appropriate tool and therefore cannot readily detach the pedal.

In addition, pedalboards with a larger number of musical effects pedals often require a power supply to power all of the musical effects pedals. This requires space, preferably on the bottom side of the pedalboard between the pedalboard and the ground. Otherwise, a power supply would have to be mounted to the top of the pedalboard, which takes away valuable space for a musical effects pedal. Many pedalboards, especially the smaller boards, do not allow for this power supply area on the bottom side.

In light of at least the above, there is room in the art for improvement.

BRIEF DESCRIPTION OF THE DRAWINGS

The invention is explained in the following description in view of the drawings that show.

DETAILED DESCRIPTION OF THE INVENTION

The Inventor has created a unique and versatile musical effects pedalboard arrangement. The musical effects pedalboard arrangement includes a pedalboard which is expandable and an attachment device which enables the musician to easily and without tools connect and disconnect the musical effects pedals to/from the pedalboard. The expandable nature of the pedalboard allows the musician to deftly and efficiently change a size of the pedalboard to accommodate changing needs. Not requiring tools enables the musician to connect and disconnect the musical effects pedal anytime and anywhere.

Figure 1:
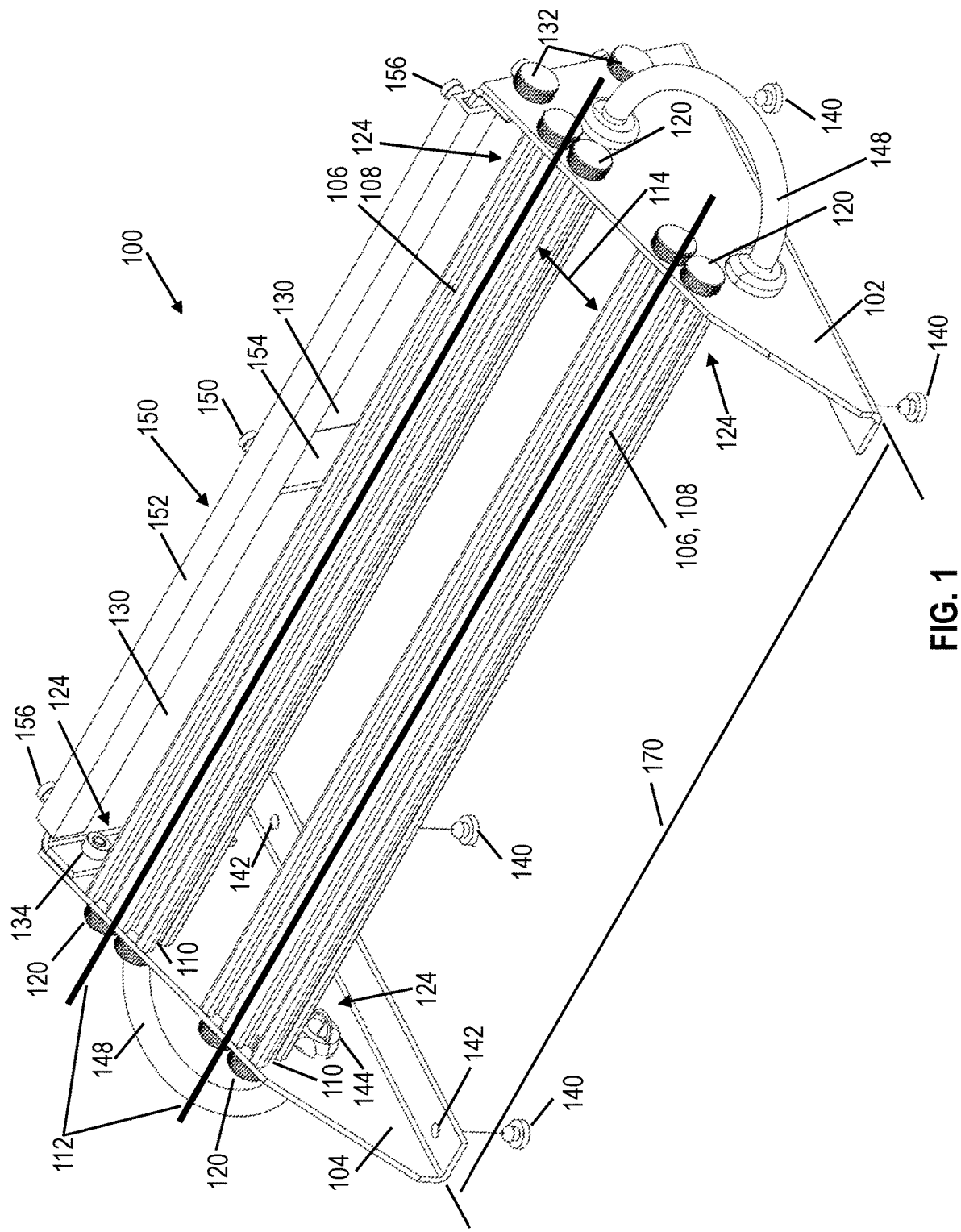
FIG. 1 shows a perspective view of an example embodiment of an extendable musical effects pedalboard in non-extended configuration.
Figure 2:
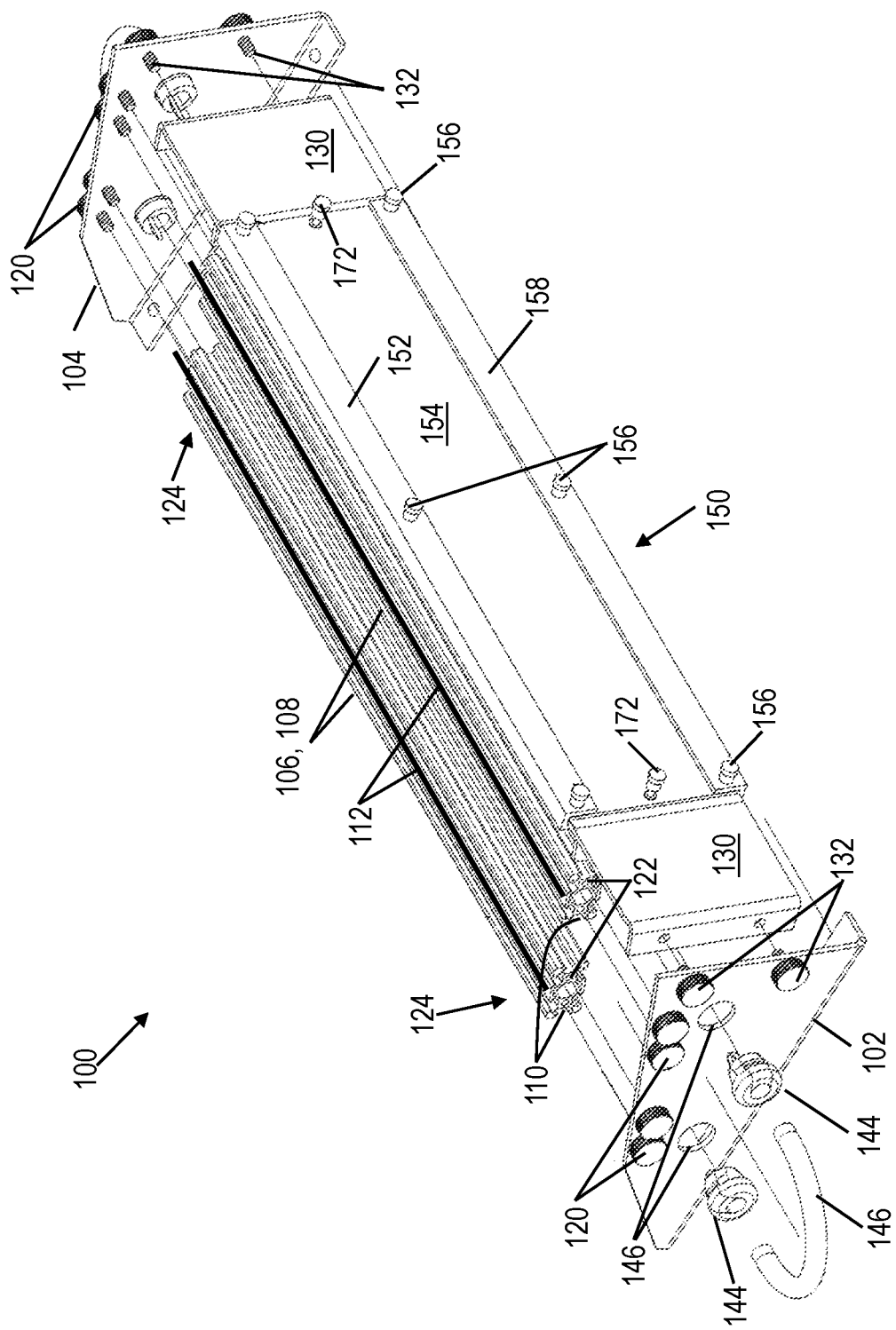
FIG. 2 shows an exploded perspective view of the extendable musical effects pedalboard of FIG. 1.

FIG. 1 and FIG. 2 show an example embodiment of a musical effects pedalboard 100 of the pedalboard arrangement disclosed herein. The musical effects pedalboard 100 includes a right support end 102, a left support end 104, and a pair of support members 106 configured to support a foot pedal for musical effects. Each support member 106 shown is a single rail 108 and is secured in position between the right support end 102 and the left support end 104. In this non-limiting example embodiment, the support members 106 are parallel to each other. Each support member 106 includes a clip feature 110 that extends along a long axis 112 for at least a portion of a length of the respective support member 106. Each support member 106 is also set apart from the other support member 106 by a gap 114.

In an example embodiment, the support members 106 are secured to the right support end 102 and the left support end 104 via fasteners 120 (e.g. thumb screws) that pass through a respective support end and which, in an example embodiment, screw into a threaded receptacle 122 in an end 124 of the respective support member 106. Adjustable front plates 130 are connected to the right support end 102 and the left support end 104 by fasteners 132 (e.g. thumb screws) which thread into adjustable front plate nuts 134. The adjustable front plates 130 are shown in a non-extended configuration in FIG. 1 and in an extended configuration in FIG. 2. Optional rubber grommets 140 are pressed into holes 142 in the left support end 104 and the right support end 102 to keep the musical effects pedalboard 100 from sliding around on the ground or stage during use. Handle grips 144 snap into holes 146 located in the right support end 102 and the left support end 104 and secure handles 148 in place.

In this example embodiment, a front track assembly 150 includes an upper channel track 152 secured to a top of a fixed front plate 154 via, for example, track fasteners 156, and a lower channel track 158 secured to a bottom of the fixed front plate 154 via, for example, the track fasteners 156. The adjustable front plates 130 are located behind the fixed front plate 154 but within the upper channel track 152 and within the lower channel track 158. The adjustable front plates 130 can move freely within the upper channel track 152 and the lower channel track 158 until a desired distance 170 between the right support end 102 and the left support end 104 suitable for accommodating the support members 106 is reached. Once the desired distance 170 is reached, the adjustable front plates 130 can be secured in position using, for example, front plate set screws 172 which are threaded thought the fixed front plate 154 and which press on and secure the adjustable front plates 130 when tightened.

Figure 3:
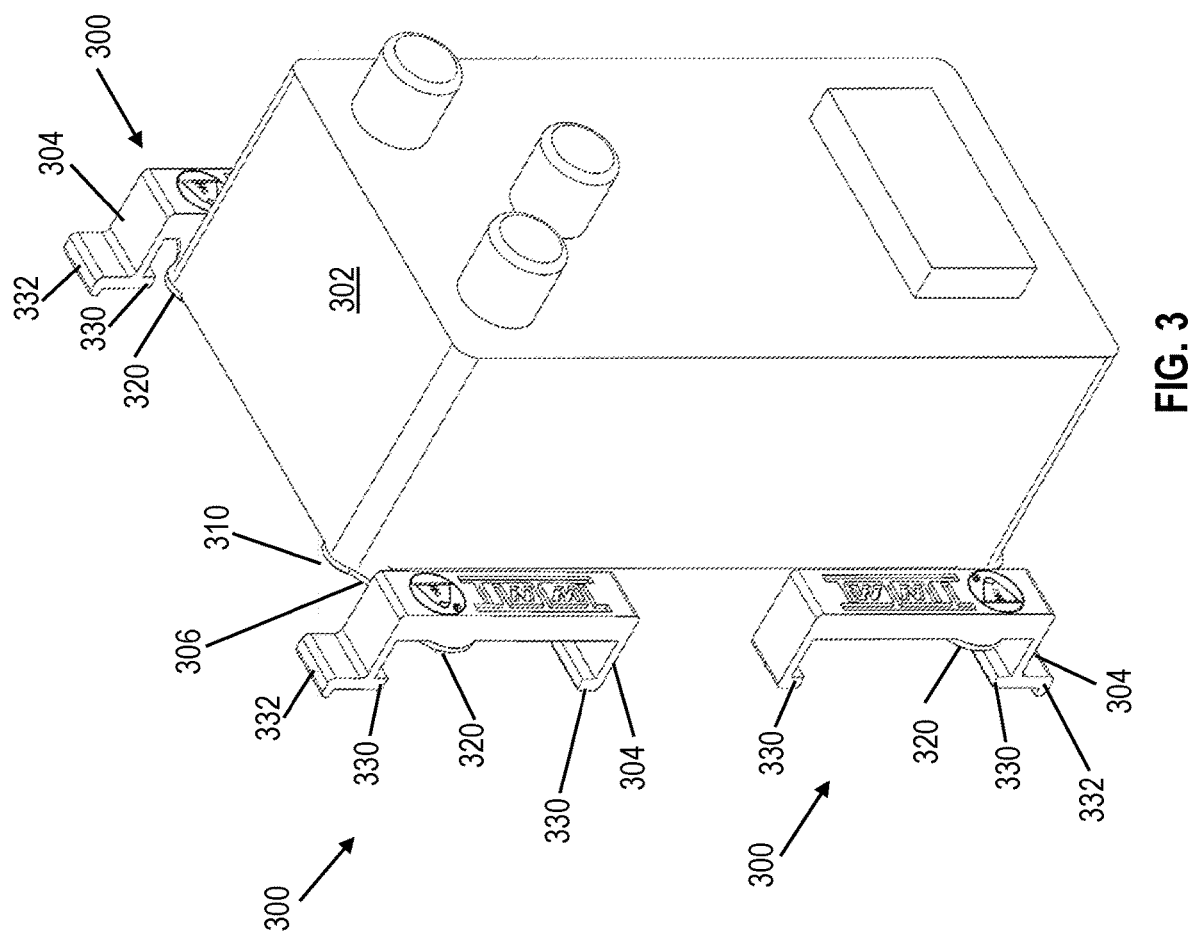
FIG. 3 shows a perspective view of an example embodiment of an attachment device attached to a musical effects pedal.
Figure 4:
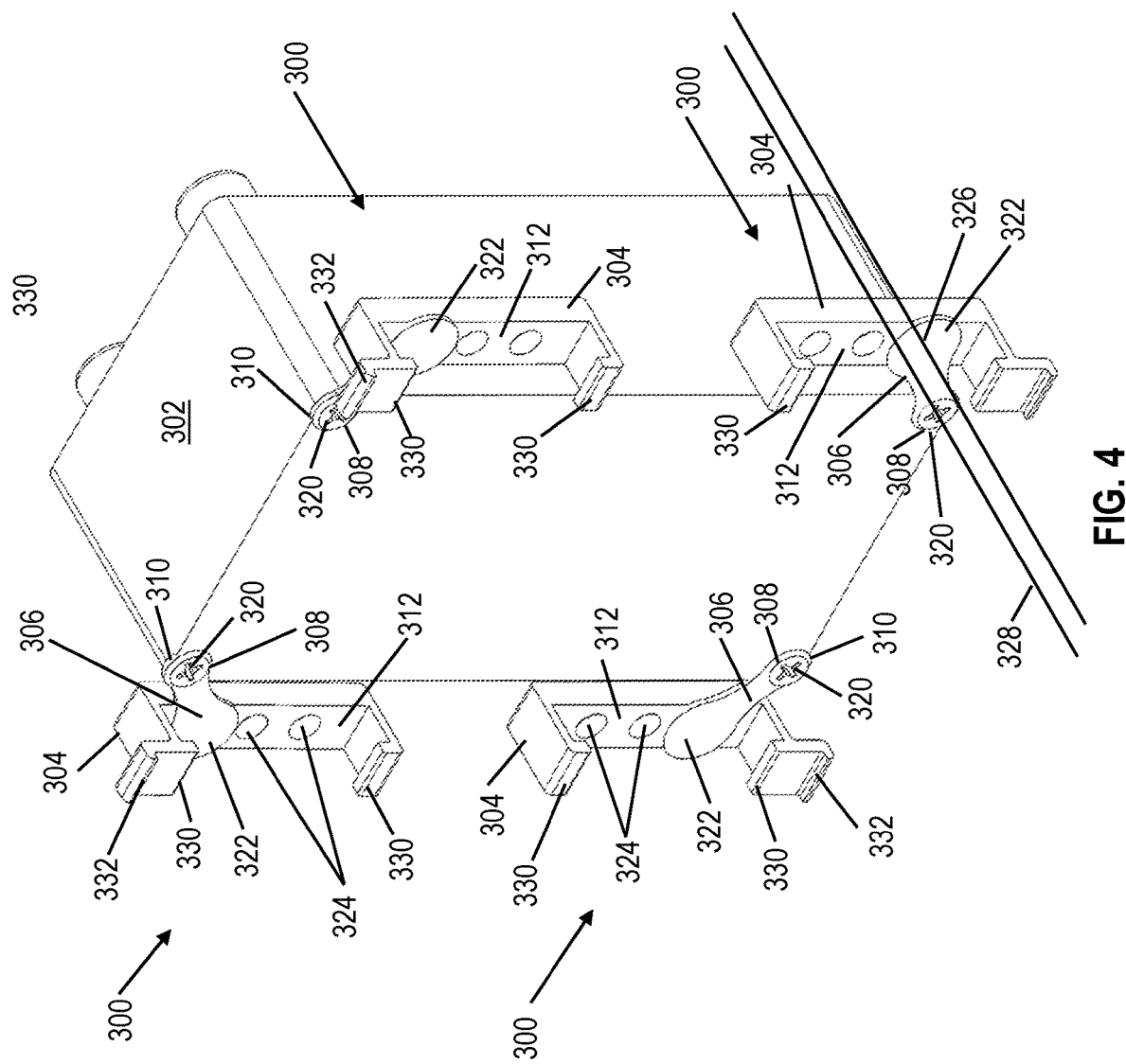
FIG. 4 shows another perspective view of the attachment device of FIG. 3.

FIG. 3 and FIG. 4 show an attachment device 300 attached to an example musical effects pedal 302. In this example embodiment, four attachment devices 300 are used. However, any number can be used, from one and up. Each attachment device 300 includes a clip 304 configured to clip onto the clip feature 110 and remain retained thereon via a resilience of the clip 304 at a variety of locations along the long axis 112; and a clip connector 306 having a clip hole 308 through a first end 310 configured to receive a fastener 320 associated with the musical effects pedal 302 and a second end 322 connected to the clip 304.

In an example embodiment, the clip 304 includes one or more connection points 324 configured to receive the second end 322 of the clip connector 306. In an example embodiment, the connection point 324 may be a female recess such as a through hole or a blind hole, and the second end 322 may include a protrusion such as a stud. In this example embodiment, the connection points 324 are disposed in a clip surface 312 that faces the support member 106 when secured to the support member 106. This arrangement traps the second end 322 of the clip connector 306 between the clip 304 and the support member 106.

In an example embodiment, the connection between the clip 304 and the clip connector 306 is a pivoting connection that enables pivoting around a clip pivot axis 326. In a non-limiting example embodiment, the clip 304 and the clip connector 306 have cooperating circular cross sectional shapes. In alternate example embodiments, the connection between the clip 304 and the clip connector 306 is a non-pivoting connection. In such an example embodiment, the connection point 324 and the clip connector stud may both have, for example, cooperating, non-circular cross sectional shapes. The clip hole 308 similarly permits the clip connector 306 to pivot about a fastener axis 328. This enables the attachment device 300 to adjust to the locations of the support members 106 through a range of sizes of gap 114, which provides great flexibility without the need for any tools. Having more than one connection point 324 increases the range of sizes of gap 114 that the attachment device 300 can accommodate. Likewise, the flexibility of the pivoting connections and the connection points 324 allow the attachment device 300 to accommodate a variety of different sizes of musical effects pedals 302 for a given gap 114.

The clip 304 further includes catches 330 configured to cooperate with the clip feature 110 to attach the musical effects pedal 302 to the support members 106. To install the clip, the clip 304 is opened against a resilience of the clip 304. This increases a distance between the catches 330. The clip 304 is then lowered onto the support member 106 and the resilience of the clip 304 is allowed to cause the catches 330 to close back, which causes the catches 330 to engage the clip feature 110. The clips 304 optionally include a finger tab 332. To disengage the clip 304, the tab finger can be lifted by finger. This releases the adjacent catch 330 from the clip feature 110 and thereby releases the clip 304 from the support member 106. Consequently, the attachment device 300 allows a musician to adjust the attachment device to make it compatible with support members 106 at different distances from each other. It also allows the musician to attach and detach the musical effects pedal 302 to/from the support member 106 without having to use any tools. The clip 304 can be made from any material that provides sufficient strength and resilience. Non-limiting example materials include plastics and thin metals.

Figure 5:
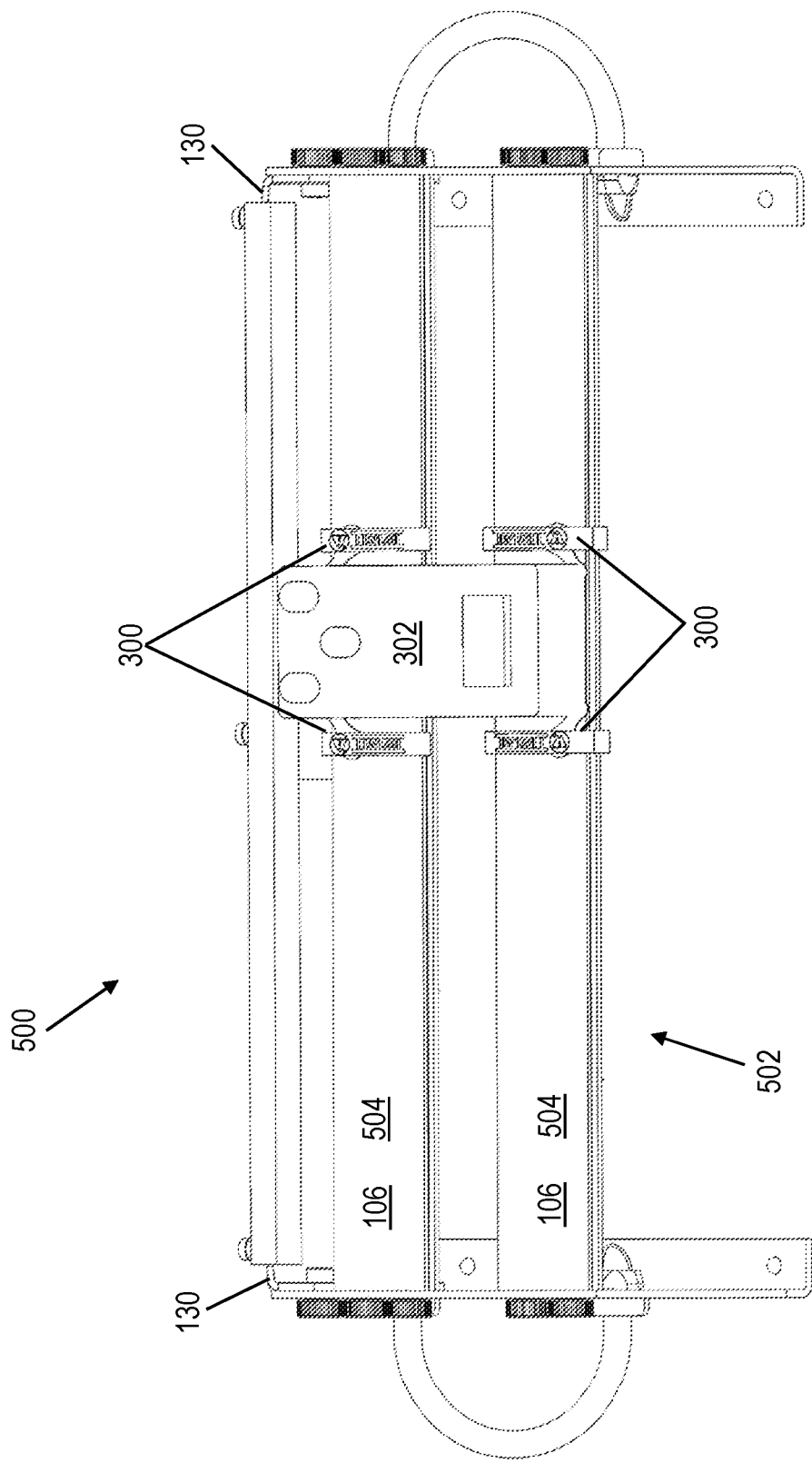
FIG. 5 shows a top view of an example embodiment of the musical effects pedalboard arrangement with an alternate example embodiment of the musical effects pedalboard in non-extended configuration and with the musical effects pedal of FIG. 3 attached

FIG. 5 shows a top view of an example embodiment of the musical effects pedalboard arrangement 500 with an alternate example embodiment of the musical effects pedalboard 502 in non-extended configuration and with the musical effects pedal 302 attached via plural attachment devices 300. The clip 304 is clipped over top surfaces 504 of the respective support members 106. In example embodiments, the clips 304 can also clip over bottom surfaces. In this example embodiment, the top surfaces 504 are smooth and free of any recesses and also free of any protrusions. Alternately, there may be one or more recesses.

Figure 6:
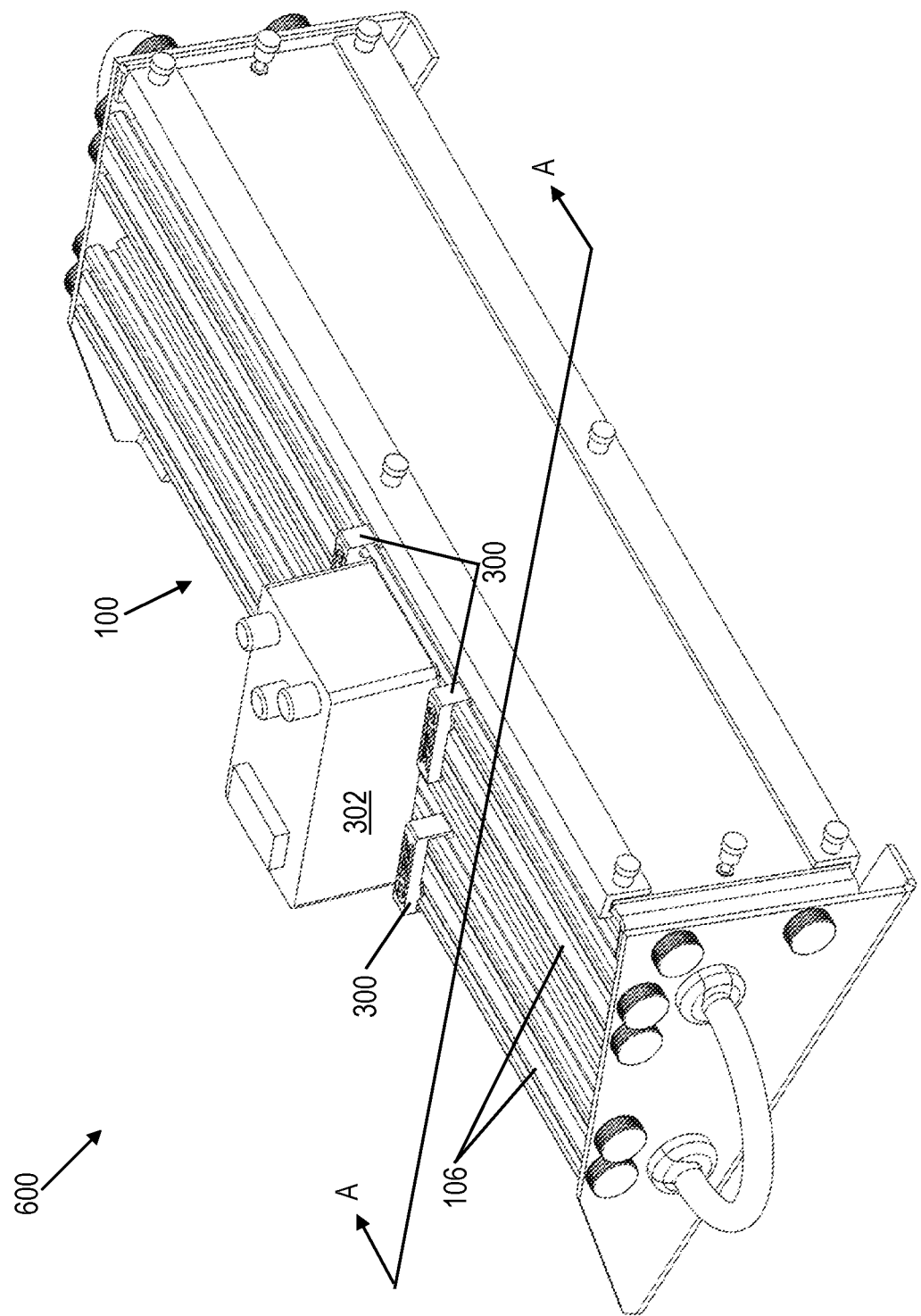
FIG. 6 shows a perspective view of an example embodiment of the musical effects pedalboard arrangement with the musical effects pedalboard of FIG. 1 and musical effects pedal attached.

FIG. 6 shows a perspective view of an example embodiment of the musical effects pedalboard arrangement 600 with the musical effects pedalboard 100 of FIG. 1 and musical effects pedal 302 attached via plural attachment devices 300.

Figure 7:
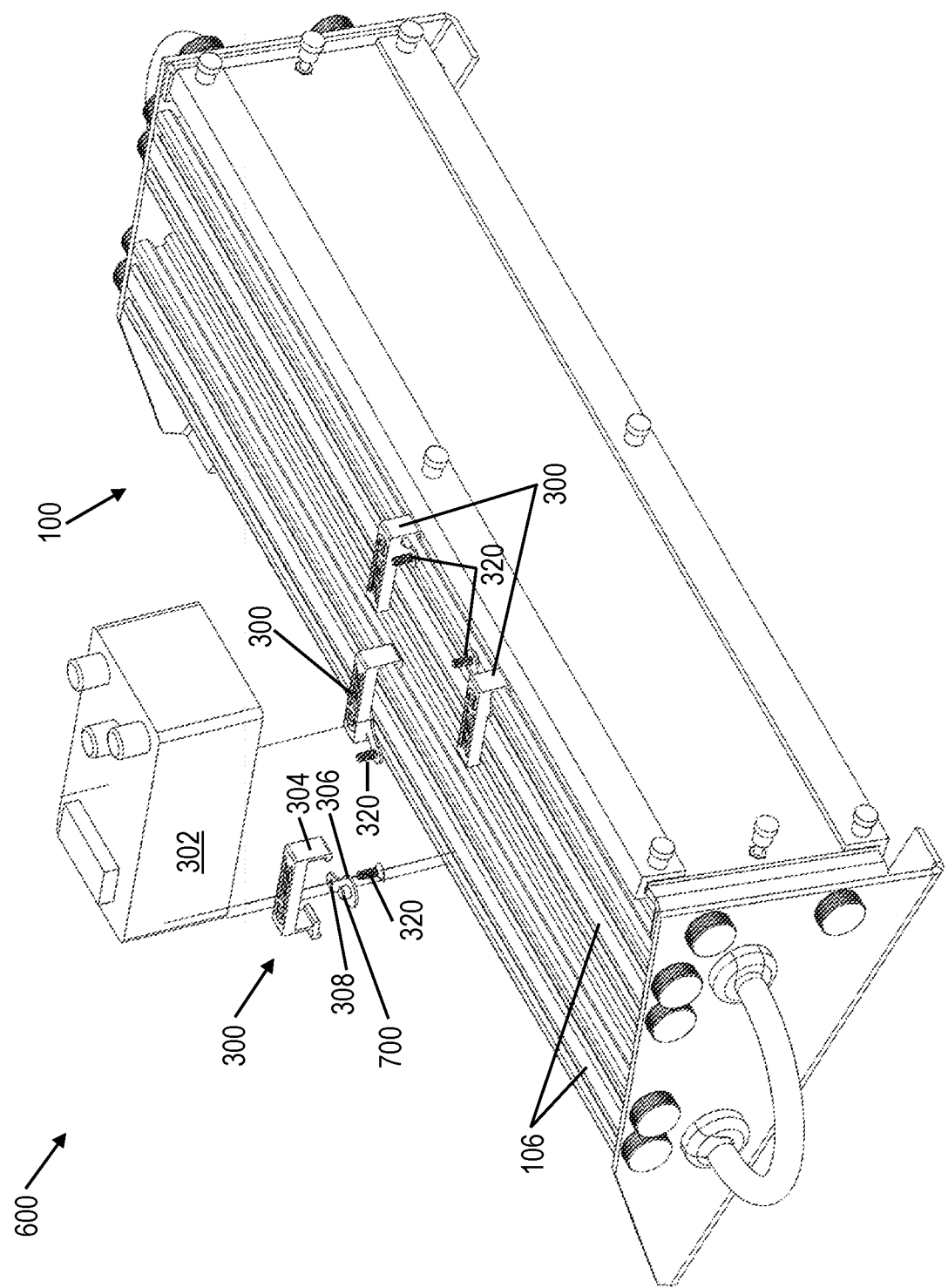
FIG. 7 shows an exploded perspective view of the musical effects pedalboard arrangement of FIG. 6.

FIG. 7 shows an exploded perspective view of the musical effects pedalboard arrangement 600 of FIG. 6. Visible are the attachment devices 300, one of which is exploded, and which shows the clip 304, the clip connector 306, the clip hole 308, and the clip connector stud 700. In the example embodiment shown, the clip connector stud 700 is cylindrical, but it need not be cylindrical.

Figure 8:
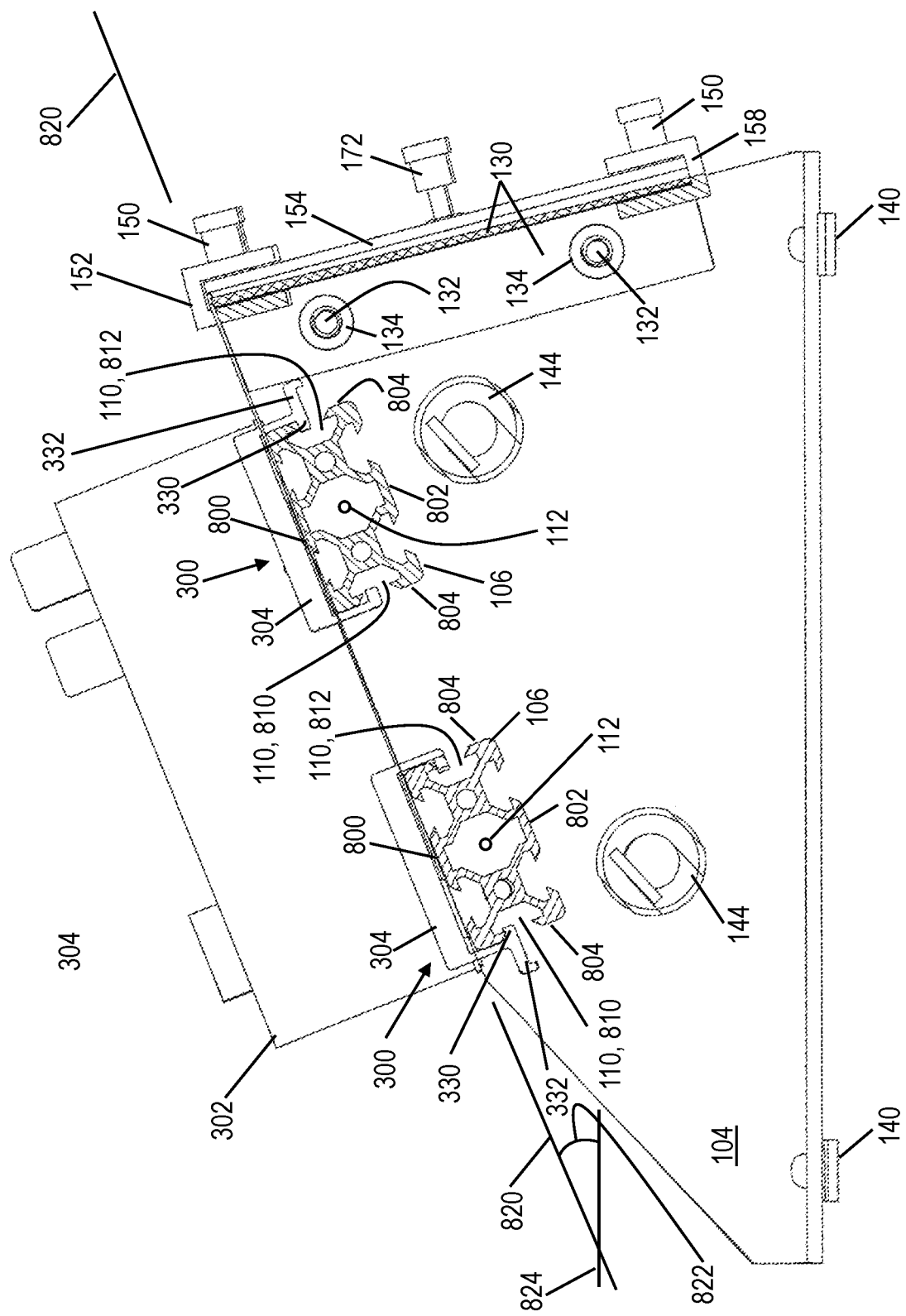
FIG. 8 shows a right side cross-sectional view of the musical effects pedalboard arrangement of FIG. 6.

FIG. 8 shows a right side cross-sectional view of the musical effects pedalboard arrangement 600 of FIG. 6 taken along line A-A of FIG. 6. In this example embodiment, the support members 106 each have a top 800, a bottom 802, and sides 804 that connect the top 800 and the bottom 802 and which are disposed on opposite sides of the support member 106. Each clip feature 110 comprises a first clip track 810 that extends along the long axis 112 and a second clip track 812 that extends along the long axis 112. The first clip track 810 and the second clip track 812 are disposed on opposite sides of the respective support member. Catches 330 of the clip 304 are configured to clip onto the first clip track 810 and the second clip track 812 and remain retained thereon via the resilience of the clip 304 at a variety of locations along the long axis 112. As shown in FIG. 8, in a first clipped position the clip 304 clips over the top 800 of the respective support member 106. In a second clipped position, (not shown), the clip 304 clips over the bottom 802 of the respective support member 106. The attachment devices 300 can be used in the second clipped position to, for example, secure a power supply to the bottom 802 of the support members 106. This keeps the top 800 free for musical effects pedals 302. The gap 114 provides a way to get wires from the power supply to the musical effects pedals 302 as well as a way to run other wires associated with the musical effects pedals 302.

In an alternate example embodiment, at least one of the first clip track 810 and the second clip track 812 may instead be a series of discrete recesses disposed along the long axis 112 and configured to cooperate with the catches 330, as opposed to a continuous track. In another alternate example embodiment, the clips 304 clip over the entire support member 106 so that the catch 330 engages with the bottom 802 of the support member 106. In this alternate example embodiment, only one clip 304 could be located at any given position along the long axis 112. In contrast, in the example embodiment shown in FIG. 8, one clip 304 could be clipped over the top 800 of the support member 106 and one clip 304 could be secured over the bottom 802 at the same position along the long axis 112 because each only extends approximately half way along the sides 804.

The tops 800 of the support members 106 define a plane 820 configured to support the musical effects pedal 302. The right support end 102 and the left support end 104 are at different elevations and thereby define an angle 822 of the plane 820 relative to a surface 824 on which the musical effects pedalboard arrangement 600 rests, such as the ground. The right support end 102 and the left support end 104 dictate the angle 822 as well as the height of the top 800 and bottom 802 of the support members 106, as well as a corresponding elevation of the respective long axes 112.

Figure 9:
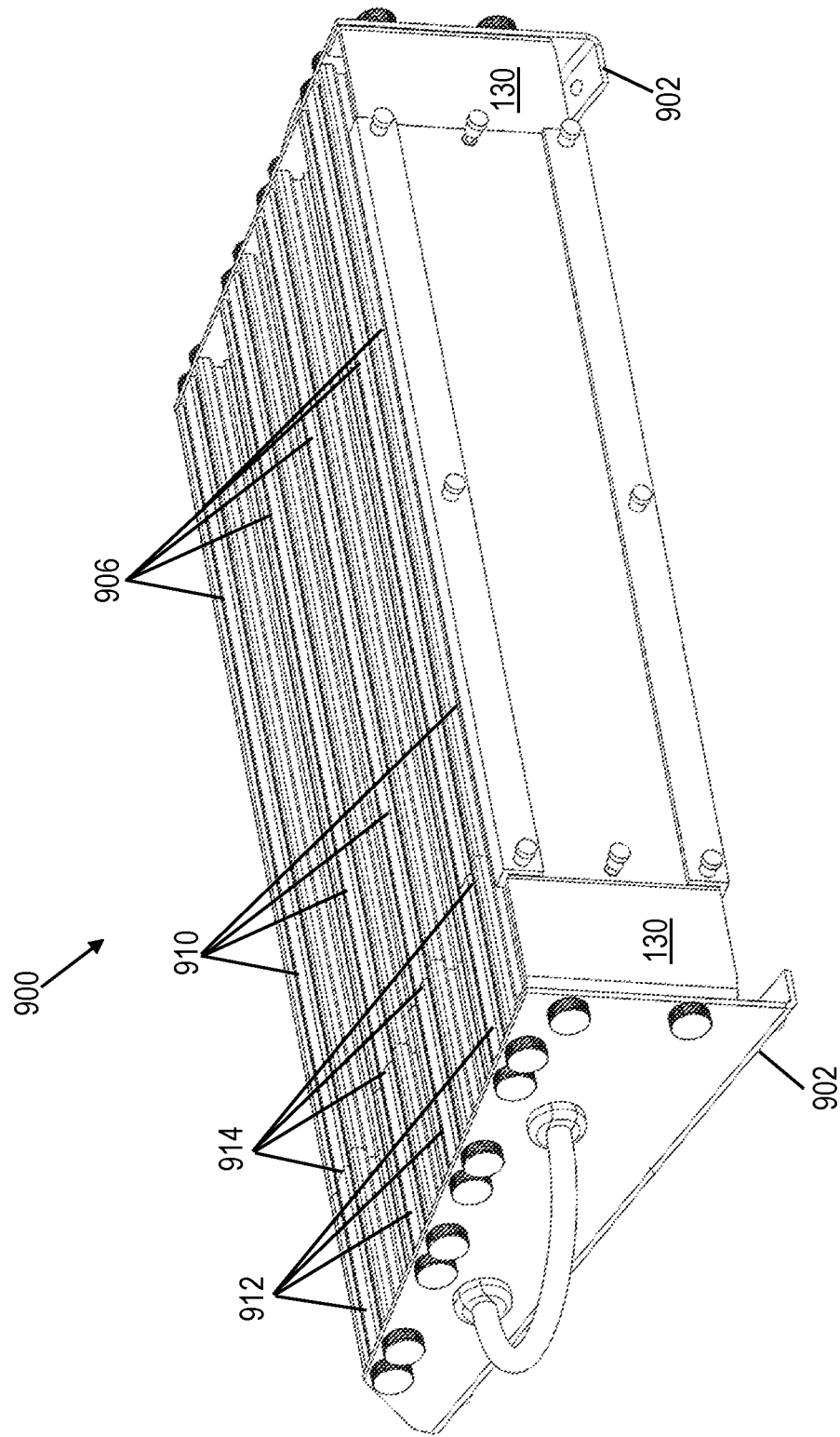
FIG. 9 shows a perspective view of an alternate example embodiment of the musical effects pedalboard in the extended configuration.

FIG. 9 shows a perspective view of an alternate example embodiment of the musical effects pedalboard 900 with the adjustable front plates 130 in the extended configuration. The musical effects pedalboard 900 is similar to the musical effects pedalboard 100 of FIG. 1. However, the musical effects pedalboard 900 includes a larger right support end 902 and a larger left support end 904 to hold multiple support members 906. The multiple support members 906 allow for more room to store musical effects pedals as well as allowing for more placement options.

In this example embodiment, each support member 906 is composed of two discrete rails 910, 912 connected to each other end-to-end at an interface 914. In this example embodiment, the two rails 910, 912 are of different sizes. However, the rails 910, 912 can be the same size. Moreover, the support member 906 may include any number of rails, each rail being any size desired. This allows the musician to assemble rails together as desired to create support members 906 of a variety of lengths. The adjustable front plates 130 are universally adjustable and so they can be adjusted to accommodate support members 106 of any length within a range of the adjustable front plates 130. If the support members 106 are longer than a particular set of adjustable front plates 130 can accommodate, the particular set of adjustable front plates 130 can be swapped out for longer adjustable front plates.

Figure 10:
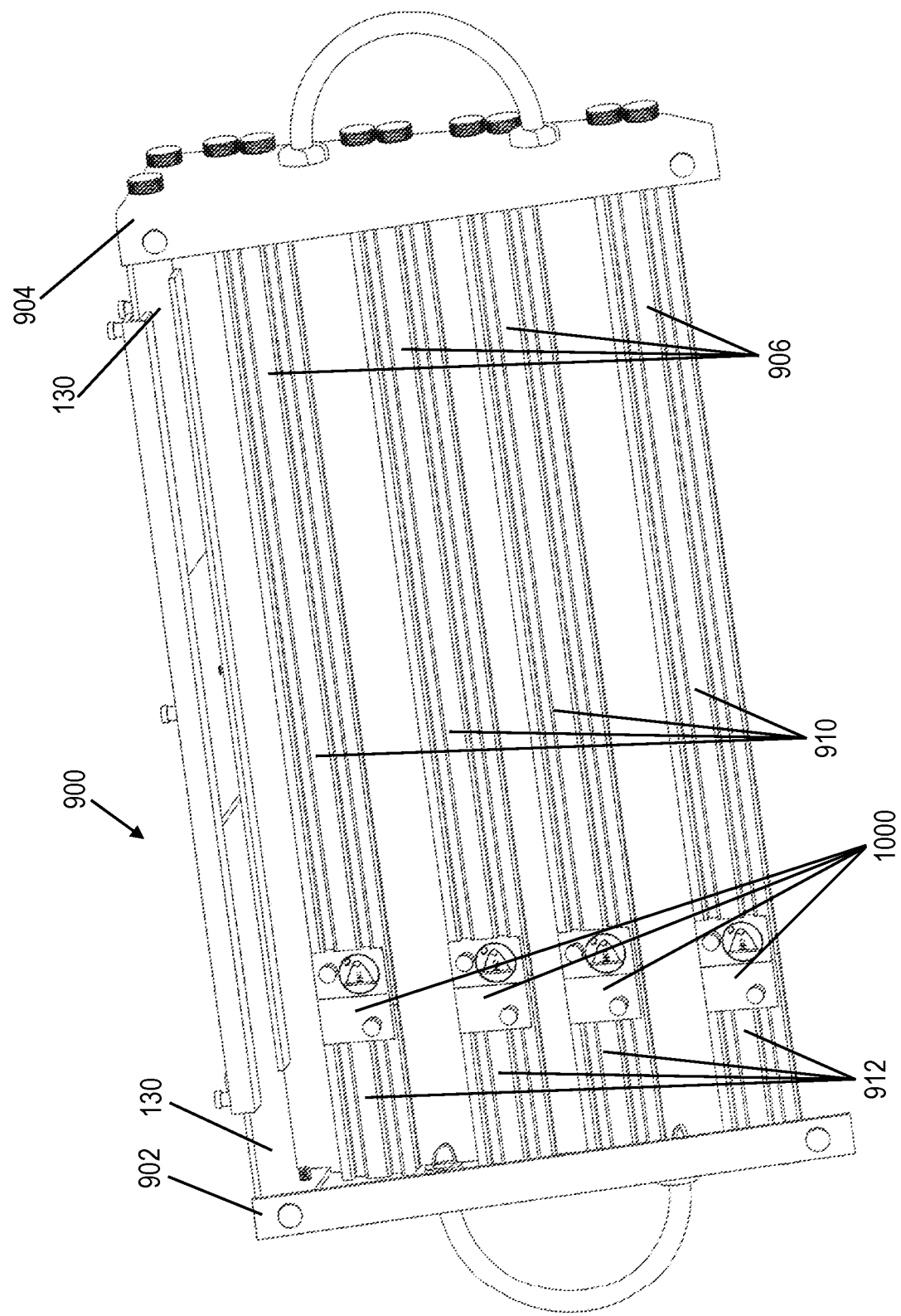
FIG. 10 shows a bottom view of the musical effects pedalboard of FIG. 9

FIG. 10 shows a bottom view of the musical effects pedalboard of FIG. 9. A rail connector 1000 can be seen securing the rails 910, 912 to each other end-to-end.

Figure 11:
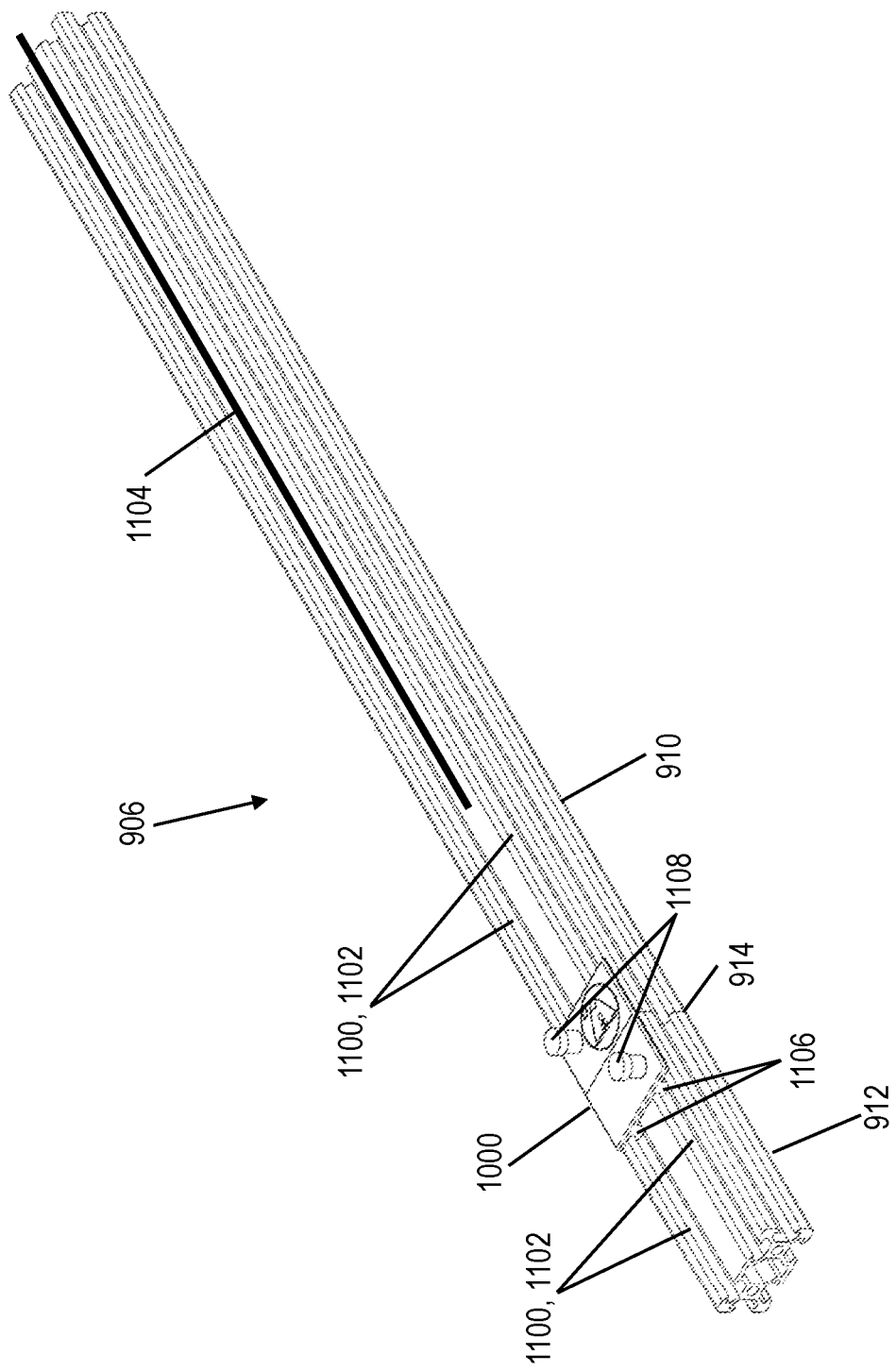
FIG. 11 shows a perspective view of the support member of the musical effects pedalboard of FIG. 9.
Figure 12:
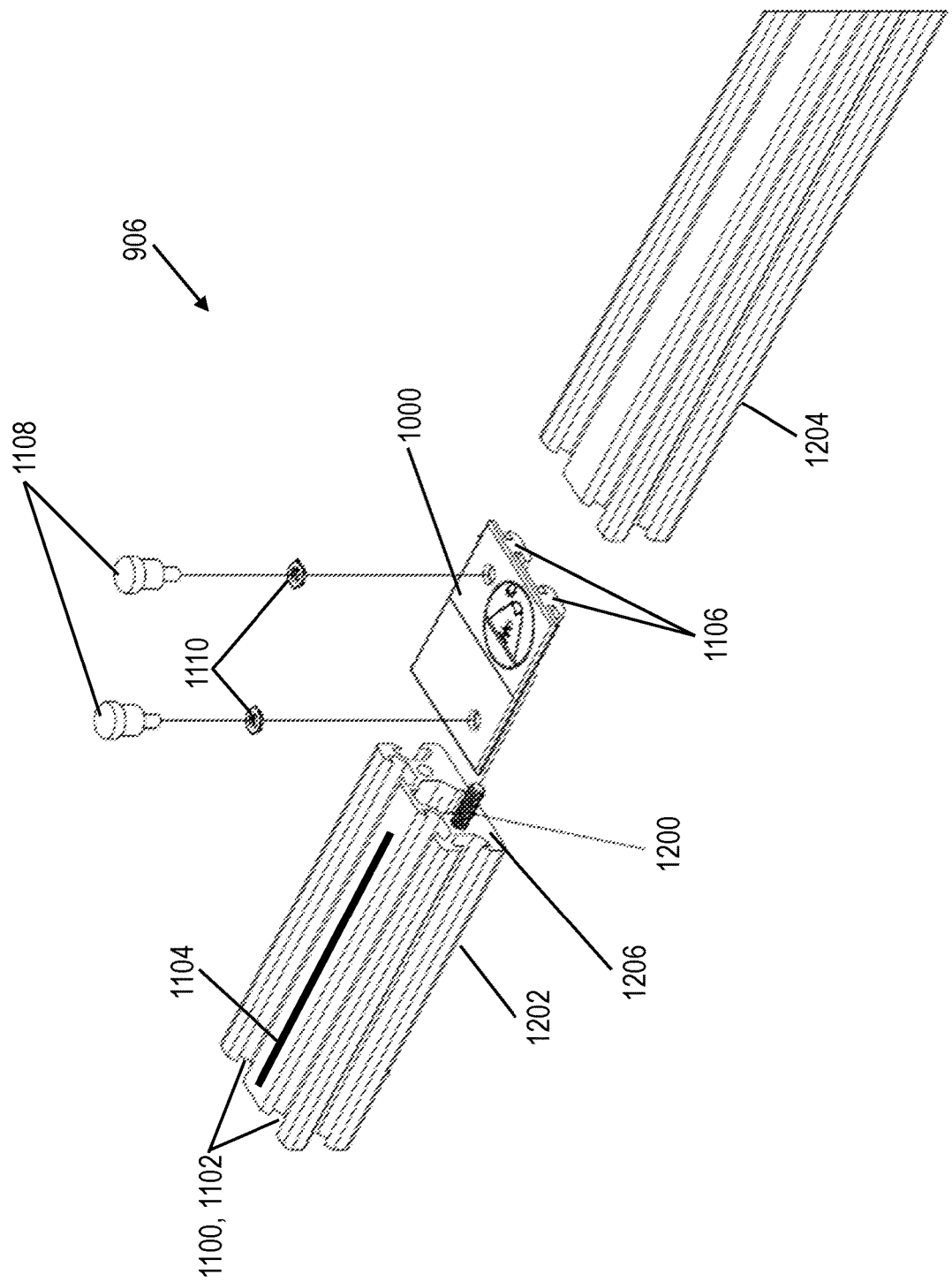
FIG. 12 shows an exploded perspective view of the support member of FIG. 11.

FIG. 11 and FIG. 12 show the support member 906 of the musical effects pedalboard 900 of FIG. 9. The rail connector 1000 cooperates with a connection feature 1100 in each rail. The connection feature 1100 in this example embodiment includes at least one connector track 1102 that extends along the long axis 1104 and is open at the interface 914 between the two rails 910, 912. The rail connector 1000 comprises an interlocking feature 1106 that extends into and geometrically interlocks with each connector track 1102. The connector track 1102 need not extend along an entire length of the rail 910, 912. Instead, the connector track 1102 can be disposed only at the ends of the rails and of a size necessary to accommodate the interlocking feature 1106 of the rail connector 1000. Optional rail connector screws 1108 are threaded into the rail connector 1000 and can be tightened to press on and secure the rails 910, 912 together. In an example embodiment, the rail connector screws 1108 are threaded into press nuts 1110 which are, in turn, pressed into the rail connector 1000.

As can be seen in FIG. 12, an optional rail stud 1200 may be used to aid the rail connector 1000 in securing the connection between the first rail 1202 and the second rail 1204. In such an embodiment, the rail connector 1000 is fully inserted in one of the rails (e.g., the first rail 1202) until the rail connector 1000 is past a bitter end 1206 of the rail. Once the rail connector 1000 is fully inserted, the first rail 1202 and the second rail 1204 can be threaded together and the connector tracks 1102 aligned. Then, the rail connector 1000 is positioned so it spans both the first rail 1202 and the second rail 1204 and the rail connector screws 1108 are then tightened. The rail stud 1200 thereby holds the first rail 1202 and the second rail 1204 together along the long axis 1104. The rail connector 1000 prevents the first rail 1202 and the second rail 1204 from rotating relative to each other which, in turn, ensures the first rail 1202 and the second rail 1204 do not disengage from the rail stud 1200.

Figure 13:
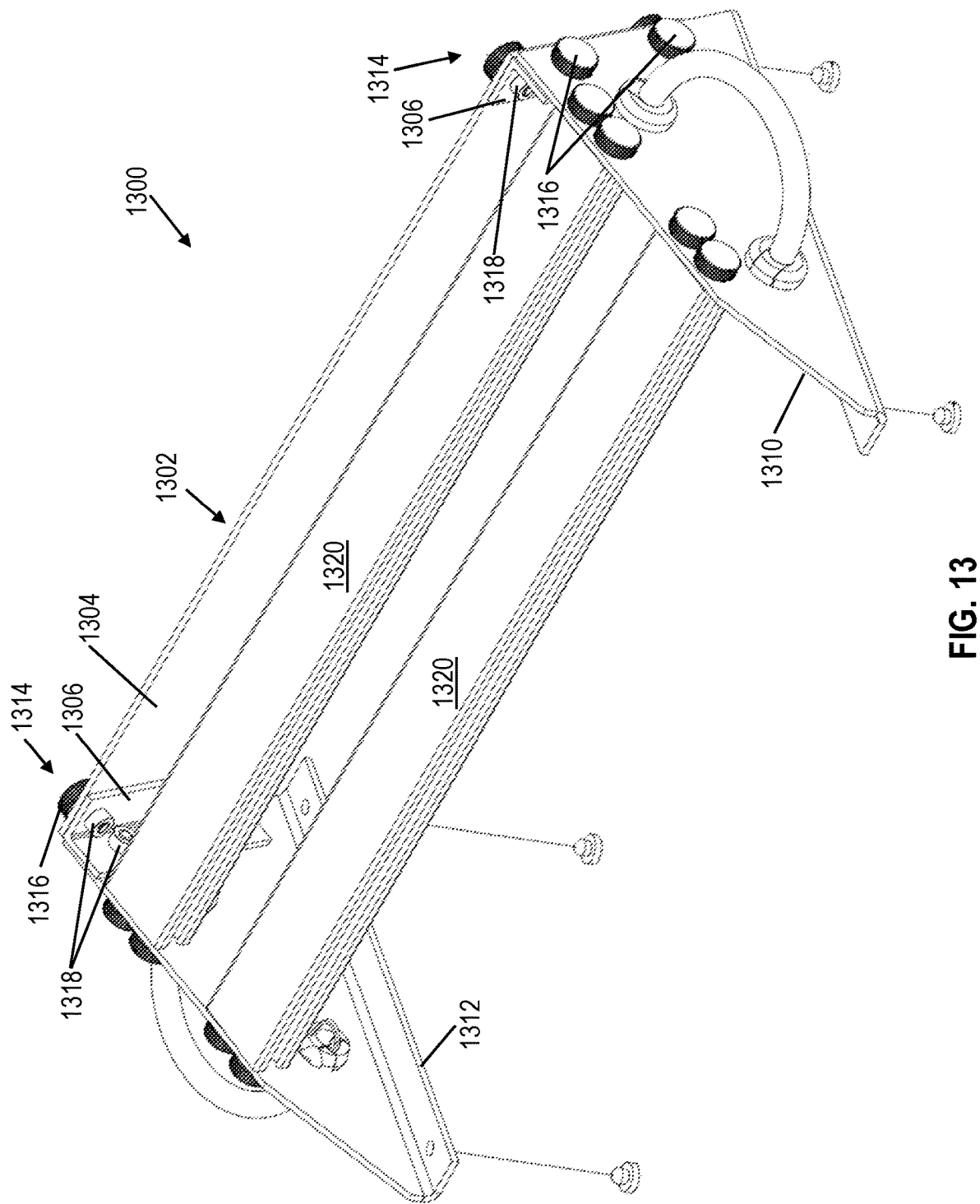
FIG. 13 shows a perspective view of an alternate example embodiment of an extendable musical effects pedalboard.
Figure 14:
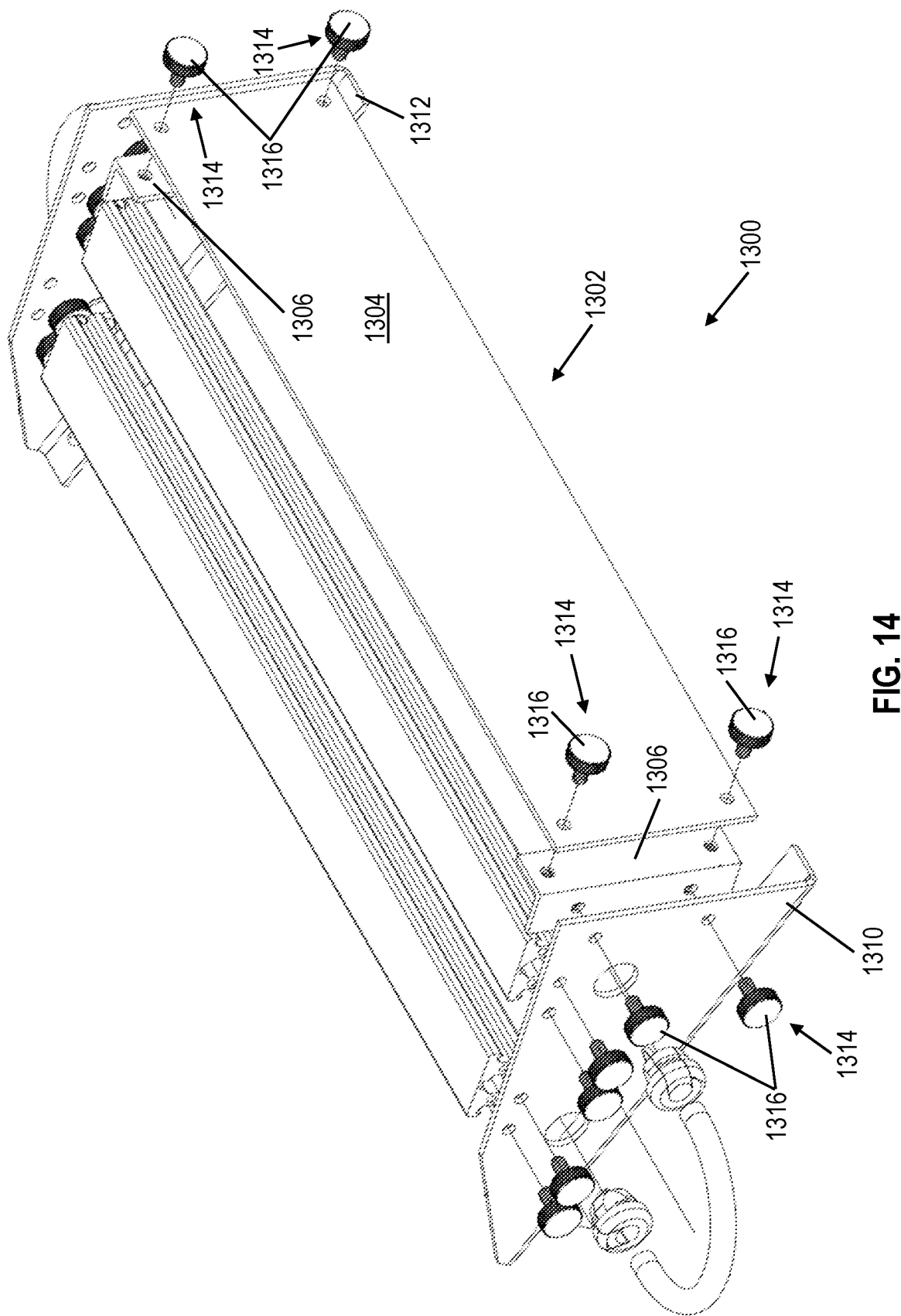
FIG. 14 shows an exploded perspective view of an alternate example embodiment of the extendable musical effects pedalboard.

FIG. 13 and FIG. 14 show an alternate example embodiment of an extendable musical effects pedalboard 1300. This example embodiment is otherwise the same as that of FIG. 1, except that the front track assembly 150 is replaced with a fixed front assembly 1302 that includes a fixed front 1304 and brackets 1306 to secure the fixed front to the right support end 1310 and the left support end 1312 via, for example, fasteners 1314 such as thumbscrews 1316 and nuts 1318. In this example embodiment, there may be any number of fixed fronts 1304 of differing lengths that are sized to accommodate support members 1320 of different lengths.

In an alternate example embodiment, the musical effects pedalboard does not have the front track assembly 150, the fixed front assembly 1302, or any connecting structure in that location. In that alternate example embodiment, the support members, the right support end, and the left support end are structurally sufficient to hold the musical effects pedalboard together.

From the foregoing it can be seen that the inventor has created a pedalboard arrangement that provides great flexibility in adjusting the size of the pedalboard. In addition, the pedalboard arrangement allows a musician to easily attach and detach musical effects pedals, without using any tools, and to adjust the attachment device to accommodate a range of musical effects pedal sizes and pedalboard sizes and configurations. Hence, it represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. A pedalboard arrangement, comprising:
a right support end;
a left support end;
a pair of support members configured to support a foot pedal for musical effects, each secured in position between the right support end and the left support end, and each comprising a clip feature that extends along a long axis of a respective support member of the pair of support members; and
an attachment device comprising: a clip configured to clip onto the clip feature and remain retained thereon via a resilience of the clip at a variety of locations along the long axis; and a clip connector comprising a clip hole through a first end configured to receive a fastener associated with the foot pedal and a second end connected to the clip.

2. The pedalboard arrangement of claim 1, wherein support members of the pair of support members are set apart from each other, thereby defining a gap therebetween.

3. The pedalboard arrangement of claim 1, wherein each support member comprises a rail connector securing two rails to each other end-to-end via a connection feature in each rail.

4. The pedalboard arrangement of claim 3, wherein the connection feature comprises a connector track that extends along the long axis and is open at an interface between the two rails, and the rail connector comprises an interlocking feature that extends into each connector track.

5. The pedalboard arrangement of claim 3, wherein the pair of support members define a plane configured to support the foot pedal.

6. The pedalboard arrangement of claim 5, wherein each long axis is positioned at a different elevation so that the plane is inclined relative to horizontal.

7. The pedalboard arrangement of claim 5, wherein surfaces of the pair of support members that define the plane are free from recesses and protrusions.

8. The pedalboard arrangement of claim 1, further comprising a fixed front plate and an adjustable front plate at each end of the fixed front plate, wherein the adjustable front plates are configured to be adjustably positionable relative to the fixed front plate to accommodate a length of the pair of support members.

9. The pedalboard arrangement of claim 1, wherein each clip feature comprises a first clip track that extends along the long axis and a second clip track that extends along the long axis.

10. The pedalboard arrangement of claim 9, wherein the first clip track and the second clip track are disposed on opposite sides of the respective support member.

11. The pedalboard arrangement of claim 1, wherein in a first clipped position the clip clips over a top of the respective support member, and in a second clipped position the clip clips over a bottom of the respective support member.

12. The pedalboard arrangement of claim 1, wherein when clipped to a respective support member, a surface of the clip facing the respective support member comprises a connection point configured to receive the second end of the clip connector, and wherein the clip traps the second end between the clip and the respective support member.

13. The pedalboard arrangement of claim 1, wherein the clip comprises a plurality of connection points configured to receive the second end of the clip connector.

14. The pedalboard arrangement of claim 1, wherein the clip comprises a connection point configured to receive the second end of the clip connector, and wherein the connection point and the second end of the clip connector form a pivot joint.

15. The pedalboard arrangement of claim 14, wherein the clip connector comprises a stud and the connection point comprises a female recess configured to cooperate with the stud to form the pivot joint.

16. The pedalboard arrangement of claim 14, and wherein when the fastener associated with the foot pedal is installed through the clip hole the clip is able to pivot about a long axis of the fastener.

17. The pedalboard arrangement of claim 1, wherein the clip comprises a finger tab configured to release the clip from the clip feature when lifted.

18. A pedalboard arrangement, comprising:
a right support end;
a left support end;
a pair of support members configured to support a foot pedal for musical effects, each secured in position between the right support end and the left support end and set apart from each other, and each comprising a first clip track and a second clip track that both extend along a long axis of a respective support member of the pair of support members; and
an attachment device comprising: a clip configured to clip onto the first clip track and the second clip track and remain retained thereon via a resilience of the clip at a variety of locations along the long axis; and a clip connector configured to be pivotally connected to a fastener associated with the foot pedal and to be pivotally connected to the clip.

19. The pedalboard arrangement of claim 18, wherein each support member comprises a rail connector securing two rails to each other end-to-end via a connector track in each rail that extends along a long axis of the respective rail and that is open at an interface between the two rails.

20. A pedalboard arrangement, comprising:
a right support end;
a left support end;
a pair of support members configured to support a foot pedal for musical effects, each being secured in position between the right support end and the left support end and set apart from each other, and each comprising a first clip track and a second clip track that both extend along a long axis of a respective support member of the pair of support members; and
an attachment device comprising: a clip configured to clip onto the first clip track and the second clip track and remain retained thereon via a resilience of the clip at a variety of locations along the long axis, wherein in a first clipped position the clip clips over a top surface of the respective support member, and in a second clipped position the clip clips over a bottom surface of the respective support member; and a clip connector configured to be pivotally connected to a fastener associated with the foot pedal and to be pivotally connected to the clip.

* * * * *